(12) United States Patent
Duzett (10) Patent No.: US 9,483,191 B2
(45) Date of Patent: Nov. 1, 2016

(54) MULTI-TIER STORAGE FOR DELIVERY OF SERVICES

(71) Applicant: ARRIS Group, Inc., Suwanee, GA (US)

(72) Inventor: Robert C. Duzett, Hillsboro, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 329 days.

(21) Appl. No.: 14/211,699

(22) Filed: Mar. 14, 2014

(65) Prior Publication Data

US 2014/0297982 A1    Oct. 2, 2014

Related U.S. Application Data

(60) Provisional application No. 61/800,689, filed on Mar. 15, 2013.

(51) Int. Cl.
| | | |
|---|---|---|
| *H04N 7/173* | (2011.01) | |
| *G06F 3/06* | (2006.01) | |
| *H04N 21/231* | (2011.01) | |
| *H04N 21/24* | (2011.01) | |
| *G06F 13/00* | (2006.01) | |

(52) U.S. Cl.
CPC .......... *G06F 3/0613* (2013.01); *G06F 3/0647* (2013.01); *G06F 3/0685* (2013.01); *H04N 21/23106* (2013.01); *H04N 21/2405* (2013.01); *H04N 21/2408* (2013.01); *G06F 3/0659* (2013.01)

(58) Field of Classification Search
CPC ................................ H04N 7/73; G06F 13/00
USPC ..................... 725/86; 711/117–122
See application file for complete search history.

(56) References Cited

U.S. PATENT DOCUMENTS

| | | | | |
|---|---|---|---|---|
| 6,557,080 B1* | 4/2003 | Burger | ............... | G06F 12/0862 711/137 |
| 7,506,008 B2* | 3/2009 | Yamamoto | ........ | G06F 17/30067 |
| 7,823,156 B2* | 10/2010 | Soules | ................. | G06F 3/0613 709/219 |
| 8,315,995 B1* | 11/2012 | Levy | ................ | G06F 17/30132 707/694 |
| 8,335,904 B1* | 12/2012 | Kitchen | .................. | G06F 13/28 707/797 |
| 2002/0078085 A1* | 6/2002 | Kikuchi | ............ | G06F 17/30902 715/205 |
| 2006/0271972 A1* | 11/2006 | Pai | ..................... | H04N 7/17327 725/86 |
| 2008/0294896 A1* | 11/2008 | Noh | ........................ | G06F 21/51 713/168 |
| 2012/0137086 A1* | 5/2012 | Oe | ........................... | G06F 3/061 711/154 |
| 2013/0246718 A1* | 9/2013 | Ono | ....................... | G06F 3/0659 711/148 |
| 2015/0106649 A1* | 4/2015 | Kannan | .................... | G06F 1/08 713/501 |
| 2015/0121024 A1* | 4/2015 | Kolvick | ............... | G06F 3/0647 711/162 |
| 2016/0077988 A1* | 3/2016 | Tipton | ................ | G06F 13/4221 710/308 |

* cited by examiner

*Primary Examiner* — Christopher Shin
(74) *Attorney, Agent, or Firm* — Bart A. Perkins (57) ABSTRACT

Methods, systems, and computer readable media can be operable to facilitate the transfer of content between two or more storage units. The transfer of content between two or more storage units can be based upon a count of the number of hits to a storage unit entry associated with the content. In embodiments, the transfer of content between two or more storage units can be further based upon a predetermined threshold associated with a period.

11 Claims, 5 Drawing Sheets

MULTI-TIER STORAGE FOR DELIVERY OF SERVICES

CROSS REFERENCE TO RELATED APPLICATION

This application is a non-provisional application claiming the benefit of U.S. Provisional Application Ser. No. 61/800,689, entitled "Hybrid Promotion Cache for Video Delivery Services," which was filed on Mar. 15, 2013, and is incorporated herein by reference in its entirety.

TECHNICAL FIELD

This disclosure relates to providing a multi-tier storage system for delivery of services.

BACKGROUND

The advent of centric delivery solutions places an increasing value on high-throughput, high-density caching servers because of high network and storage demands. This increasing demand presents a challenge to develop storage based on fast, dense, reliable, and inexpensive storage systems. Currently, there is no storage medium that sufficiently meets all of these requirements. Random access memory (RAM) is fast but capacity-limited and very expensive; hard disk drives (HDDs) are high capacity and inexpensive, but slow; flash-based solid-state drives (SSDs) are relatively fast and moderately high-capacity, but very expensive, particularly the single-level-cell type that can support write traffic of a typical storage. Therefore, an improvement to data caching is desired, wherein the improvement can meet high-throughput and high-capacity needs at a low cost.

BRIEF DESCRIPTION OF THE DRAWINGS

Like reference numbers and designations in the various drawings indicate like elements.

DETAILED DESCRIPTION

Methods, systems, and computer readable media can be operable to facilitate the transfer of content associated with, or stored within a storage unit entry (e.g., data associated with content such as information, video, audio, etc.) between two or more storage units. For example, a storage unit entry can include data corresponding with stored content and identification data and/or history field (e.g., data that serves to identify and/or indicate a status of the content stored within the storage unit entry). A storage unit can include a storage (e.g., SSD, HDD, etc.), a memory, a cache, or any other component that is operable to store data, and a storage unit entry can be a location for storing data within a storage unit. The transfer of content between two or more storage units can be based upon a count of the number of hits to the storage unit entry, or the number of requests for the content associated with the storage unit entry. In embodiments, the transfer of content between two or more storage units can be further based upon a predetermined threshold associated with a period.

Systems and methods of this disclosure can operate to implement a multi-tier storage using a mixture of storage components to achieve storage efficiencies while reducing costs. In embodiments, a multi-tier storage can produce higher streaming densities at lower costs than existing storage components used alone, thereby yielding a storage solution that simultaneously meets the goals of high throughput (e.g., rate of data reception/input or delivery/output), high density, and low cost. For example, a server (e.g., a video-on-demand server) can include a primary storage unit for storing content that is frequently requested and a secondary storage unit for storing content that is less frequently requested. The primary storage unit can be a storage medium that has a high throughput capability (e.g., SSD), and the secondary storage unit can be a storage medium that has a high storage capacity (e.g., HDD), thereby providing the server with greater bandwidth or throughput with which to provide popular content as well as greater storage capacity with which to store less-popular content.

In embodiments, a method can be used to ascertain the dynamic popularity of content associated with a storage unit entry by introducing a time-bounded popularity method. In embodiments, this method can introduce a rolling period window whereby content can be transferred from one storage unit to another when a play count (e.g., a count of the number of times a storage unit entry or content associated with the storage unit entry is requested) exceeds a transfer threshold. The rolling period window approach can be tuned by configuring various parameters (e.g., the number of periods for which to retain information, the length of each period, a transfer threshold defining a maximum number of storage unit entry hits over a period of time before the content is transferred from one storage unit to another).

In embodiments, a period can be defined in terms of total play requests to respond to traffic variations. In such embodiments, a rolling total play requests can be used to form a dynamic total play requests window, and this window can be adjusted according to traffic and/or storage unit behavior. It should be understood that this approach can be used in place of, in addition to, or in conjunction with a rolling time period counter approach.

Figure 1:
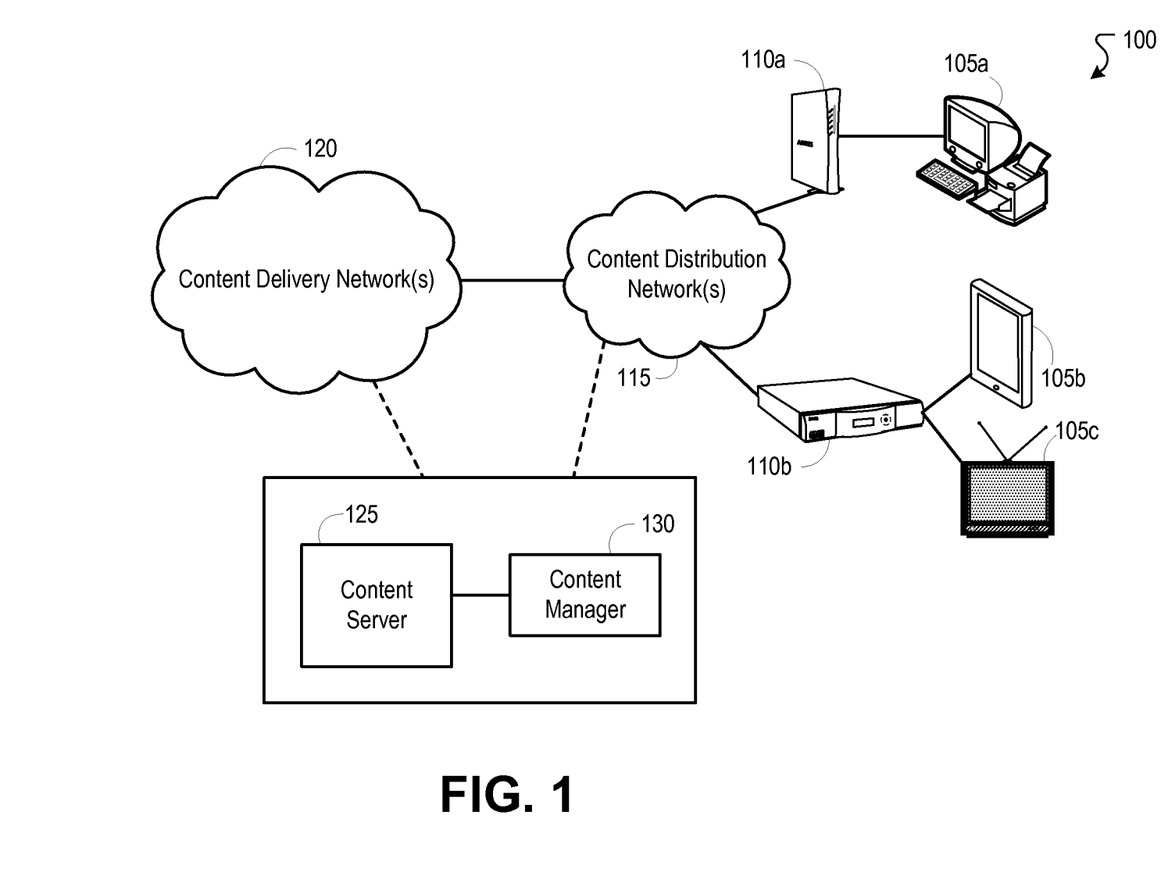
FIG. 1 is a block diagram illustrating an example network environment operable to provide multi-tier storage for delivery services.

FIG. 1 is a block diagram illustrating an example network environment 100 operable to provide multi-tier storage for delivery services. One or more client devices 105*a-c* (e.g., computer 105*a*, mobile device or tablet 105*b*, internet protocol (IP) television 105*c*, etc.) can be connected to a customer premise equipment (CPE) device 110*a-b* (e.g., modem 110*a*, gateway 110*b*, etc.). In embodiments, CPE devices 110*a-b* can be connected to a content distribution network 115.

In embodiments, client device(s) 105*a-c* can communicate with one or more content delivery networks 120 via a connection to a content distribution network 115. For example, client device(s) 105*a-c* can request content (e.g., data, video, etc.) from a content server 125 by transmitting a request to a content distribution network 115, and the request can be routed from to the content server 125 via a content delivery network 120. In embodiments, the content distribution network 115 can take the form of an all-coaxial, all-fiber, hybrid fiber-coaxial (HFC) network, an over-the-air network, a telephone network, for example, among many others. It should be understood that the content server 125 can represent a local content server at a headend (e.g., a cable modem termination system) or can be provided by a service provided via a connection to the content delivery network(s) 120. In embodiments, content from the content server 125 can be delivered to a CPE device 110a-b through a content delivery network 120 or a content distribution network 115. It should be understood that content from the content server 125 can be delivered directly to a client device 105a-c through a content distribution network 115.

In embodiments, content stored on the content server 125 can be processed using various mechanisms. For example, video content stored on the content server 125 can be processed using either an MPEG-2 or an MPEG-4 coder-decoder (CODEC) to produce an MPEG transport stream. The MPEG transport stream can then be transmitted by the content server 125 to a client device 105a-c over a content distribution network 115 and/or a content delivery network 120. In embodiments, the MPEG transport stream can be converted to a signal that can be transported through a content distribution network 115 and/or a content delivery network 120.

In embodiments, the content server 125 can include a plurality of storage units. In embodiments, an initial storage unit load can be implemented to increase performance of the content server 125. In such embodiments, the peak-miss and write loads can be avoided when a storage unit within the content server 125 is empty, or near empty. In embodiments, controlled pre-placement of content (e.g., cache-warming), managed pacing of pull-thru into empty storage units, avoidance of storage unit restarts during primetime, and/or other approaches can be used in conjunction with multi-tier storage methods.

In embodiments, content included within the content server 125 can be managed by a content manager 130. The content manager 130 can be operable to allocate node capacity (e.g., capacity of the content server 125) to content objects. In embodiments, the allocation can be based on a best-fit, random, or hybrid allocation process. In embodiments, the content manager 130 can be further operable to select nodes for streaming and failover based upon requests received from any of the client devices 105a-c. In embodiments, the content manager 130 can also identify instances of exceptional asymmetries in content allocation and/or use of streaming resources and demand for scaling the allocated resources. In embodiments, the content manager 130 and content server 125 can reside in the same physical server.

Figure 2:
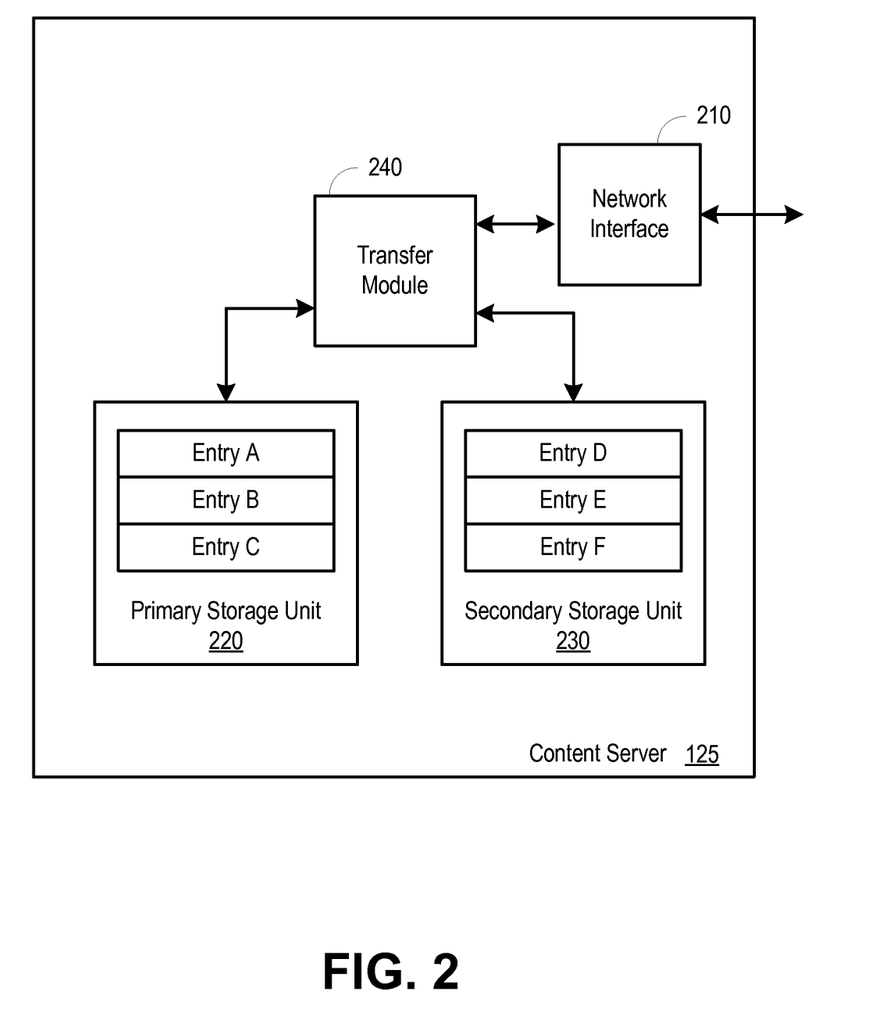
FIG. 2 is a block diagram illustrating an example server operable to provide multi-tier storage for delivery services.

FIG. 2 is a block diagram illustrating an example content server 125 operable to provide multi-tier storage for delivery services. In embodiments, the content server 125 can include a network interface 210, a primary storage unit 220, a secondary storage unit 230, and a transfer module 240. In embodiments, a network interface 210 can be used to receive an inquiry for a storage unit entry within the content server 125. In embodiments, the network interface 210 can be used to output data associated with a storage unit entry (e.g., storage unit entries A-F). In embodiments, the network interface 210 can be used to input data to be stored within the content server 125. It should be understood that the network interface 210 can be implemented as multiple interfaces.

In embodiments, a primary storage unit 220 can store a plurality of storage unit entries (e.g., storage unit entries A-C). The plurality of storage unit entries that are stored within the primary storage unit 220 can be storage unit entries that are frequently requested. In embodiments, the primary storage unit 220 can be smaller and faster than a secondary storage unit 230. For example, the primary storage unit 220 can provide for efficient access to more popular content or more frequently requested content. In embodiments, the primary storage unit 220 can be a solid-state drive (SSD). It should be understood that the primary storage unit 220 can include various storage mediums (e.g., data cache, static memory, hard disk, flash memory, etc.).

In embodiments, a secondary storage unit 230 can store a plurality of storage unit entries (e.g., storage unit entries D-F). The plurality of storage unit entries that are stored within the secondary storage unit 230 can comprise storage unit entries that are associated with data that is requested by a client device 110a-c of FIG. 1. For example, each secondary storage unit entry can include data corresponding with requested content and a history field that can store and update information associated with the requested content (e.g., a number of times the content has been requested). In embodiments, the secondary storage unit 230 can be used to store data or storage unit entries associated with content that is less popular or less frequently accessed than content stored in the primary storage unit 220. For example, when a secondary storage unit 230 is full, data that is associated with content that is requested by a client device 110a-c, or otherwise new data, can be inserted into the secondary storage unit as a most-recently used (MRU) entry, and a least-recently used (LRU) entry can be discarded from the secondary storage unit. In embodiments, miss data can be added to the secondary storage unit 230. In embodiments, the secondary storage unit 230 can be a hard disk drive (HDD). It should be understood that the secondary storage unit 230 can include various storage mediums (e.g., data cache, static memory, hard disk, flash memory, etc.).

In embodiments, when content is inserted into the secondary storage unit 230, the activity history associated with the content can be set or reset. For example, when content is inserted into the secondary storage unit 230, the activity history of the content can be updated to include the most recent time at which the content or a storage unit entry associated with the content was hit. As another example, when content is inserted into the secondary storage unit 230, the activity history of the content can be set or reset so that the activity history indicates that the content or a storage unit entry associated with the content has received no hits. In embodiments, the activity history of content, such as the number of times the content is hit or requested (e.g., content associated with a storage unit entry is requested by a client device), can be maintained within a server (e.g., content server 125) or data store as a play count. In embodiments, when content is inserted into the secondary storage unit 230, the activity history of the content can be retrieved from a server or data store and can be included as a history field in a count tag associated with the content. For example, the play count for content can be set to the most recent play count value associated with the content or a storage unit entry associated with the content. In embodiments, the activity history for content can be periodically reset. For example, the play count for content can be maintained for a predetermined period of time (e.g., in a server or data store) and then reset or attenuated (e.g., scaled down) upon the expiration of the predetermined period of time. In embodiments, a secondary storage unit entry can include a count tag, wherein the count tag comprises one or more period counters. When content is inserted into the secondary storage unit, period counters associated with the storage unit entry can be set to indicate that the content has yet to be hit more than once, or that the content has been hit once during the current period. It should be understood that period counters associated with a storage unit entry can be stored at a server or data store.

In embodiments, a transfer module 240 can compare an activity history associated with content stored in the secondary storage unit 230 to a predetermined threshold. For example, a piece of content's activity history can include a variety of information that serves to indicate a number of times that the content or a storage unit entry associated with the content has been hit and/or the times at which the storage unit entry has been hit. In embodiments, a piece of content's activity history can be maintained as a count tag associated with the content. For example, a storage unit entry's count tag can be updated and/or incremented each time content associated with the storage unit entry is hit, thus maintaining a count of the number of times the content is hit and/or an identification of the time at which the content was hit. In embodiments, a piece of content's activity history can be maintained in a data store, and a tag associated with the content can point to the stored activity history. In embodiments, if a hit to a secondary storage unit entry (e.g., storage unit entries D-F) pushes that storage unit entry's activity history (could be as simple as a play count) beyond a predetermined transfer threshold, content associated with the storage unit entry can be transferred to the primary storage unit 220.

In embodiments, a transfer module 240 can transfer content from the secondary storage unit 230 to the primary storage unit 220. For example, when an activity history associated with a secondary storage unit entry (e.g., storage unit entries D-F) reaches a predetermined threshold, the transfer module 240 can write the content of the secondary storage unit entry to the primary storage unit 220. In embodiments, after the content is written to the primary storage unit 220, the content can be removed from the secondary storage unit entry. For example, the content can become the MRU entry of the primary storage unit 220. In embodiments, when content is transferred to the primary storage unit 220, a LRU entry within the primary storage unit can be transferred from the primary storage unit to the secondary storage unit. For example, the LRU entry of the primary storage unit can become the MRU entry of the secondary storage unit 230, and the activity history associated with the storage unit entry can be reset. The migration of a LRU block from the primary storage unit back into the secondary storage unit allows the storage unit entry to continue to be hit unless or until it eventually falls out the bottom of the secondary storage unit, while also providing the opportunity for the content associated with the storage unit entry to be transferred back to the primary storage unit if warranted.

Figure 3:
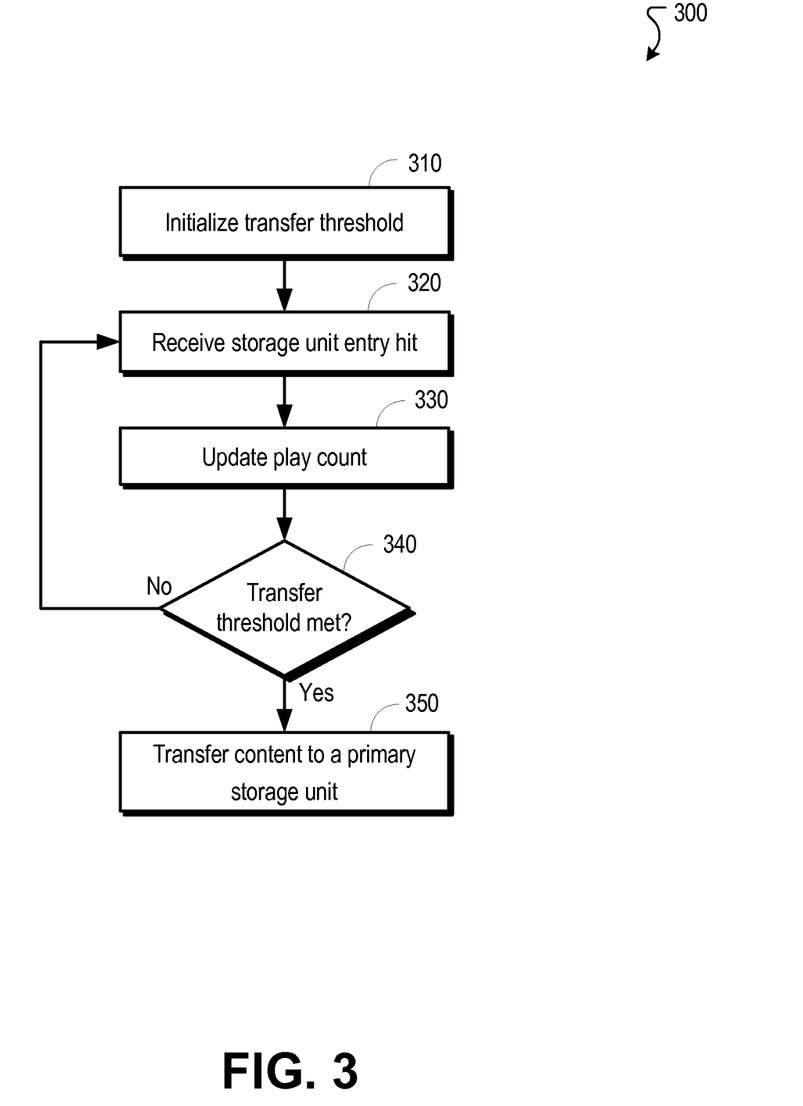
FIG. 3 is a flowchart illustrating an example operational scenario for multi-tier storage for delivery services.

FIG. 3 is a flowchart illustrating an example process 300 for operating a multi-tier storage for delivery services. In embodiments, a play count associated with a storage unit entry can be compared to a transfer threshold. For example, when a secondary storage unit entry is hit, a play count associated with the secondary storage unit entry can be incremented, and if the play count eventually meets a transfer threshold, then the content associated with the secondary storage unit entry can be transferred to a primary storage unit. The process 300 can start at 310 where a transfer threshold is initialized for a secondary storage unit. In embodiments, the transfer threshold can be a fixed number. In embodiments, the transfer threshold can be variable based upon factors such as, for example, a capacity or load associated with a content server 125 of FIG. 1, a capacity or load associated with a content distribution network 115 of FIG. 1, the amount of traffic that is expected for a storage unit, the type of content or data stored within the storage unit, among many other factors. In embodiments, to avoid a slow ramp to steady-state behaviors, it can be beneficial to begin with a low transfer threshold (e.g. one (1) play for insertion into a secondary storage unit section of the server and one (1) hit for transfer into the primary storage unit section) until the respective storage units are mostly full, at which point the transfer threshold can be raised to the desired level. It should be understood that such caching improvements can be used in conjunction with the multi-tier storage methods described herein.

At 320, a storage unit entry hit to a storage unit entry that is within a secondary storage unit (e.g., secondary storage unit 230 of FIG. 2) can be received. In embodiments, a storage unit entry hit can be the reception of a request for content or data that is associated with the storage unit entry by a server (e.g., content server 125 of FIG. 1).

At 330, a play count associated with the storage unit entry for which a hit is received can be incremented. In embodiments, a count tag associated with the storage unit entry can be updated to reflect the hit to the storage unit entry. For example, each storage unit entry can include a count tag that indicates the number of times the corresponding storage unit entry has been hit or the number of times the content associated with the storage unit entry has been requested. When a secondary storage unit entry is hit, the number that is indicated by the count tag of the storage unit entry can be incremented to account for the hit. In embodiments, an activity history associated with a storage unit entry or the content associated with the storage unit entry can be maintained, for example, within a server or data store. When the secondary storage unit entry is hit, the activity history associated with the storage unit entry can be updated to account for the hit.

At 340, a determination can be made whether the transfer threshold has been met by the storage unit entry that is hit. In embodiments, the activity history, or current play count, associated with the hit storage unit entry can be compared to the transfer threshold. For example the activity history, or play count associated with the storage unit entry can indicate a number of times that the storage unit entry has been hit, and this number can be compared to the transfer threshold. If the activity history, or play count, associated with the storage unit entry is less than, or in some cases equal to, the transfer threshold, the determination can be made that the transfer threshold has not been met and the process 300 can return to 320. If the activity history, or play count associated with the storage unit entry is greater than, or in some cases equal to the transfer threshold, the determination can be made that the transfer threshold has been met and the process 300 can proceed to 350.

At 350, the content associated with the storage unit entry for which the transfer threshold has been met can be transferred from the secondary storage unit to a primary storage unit (e.g., primary storage unit 220 of FIG. 2). In embodiments, a transfer module 240 of FIG. 2 can write the content of the secondary storage unit entry to the primary storage unit 220. In embodiments, after the content is written to the primary storage unit 220, the content can be removed from the secondary storage unit entry. For example, the content can become the MRU entry of the primary storage unit 220. In embodiments, when content is transferred to the primary storage unit 220, a LRU entry within the primary storage unit can be transferred from the primary storage unit to the secondary storage unit. For example, the LRU entry of the primary storage unit can become the MRU entry of the secondary storage unit 230, and the activity history associated with the storage unit entry can be reset.

Figure 4:
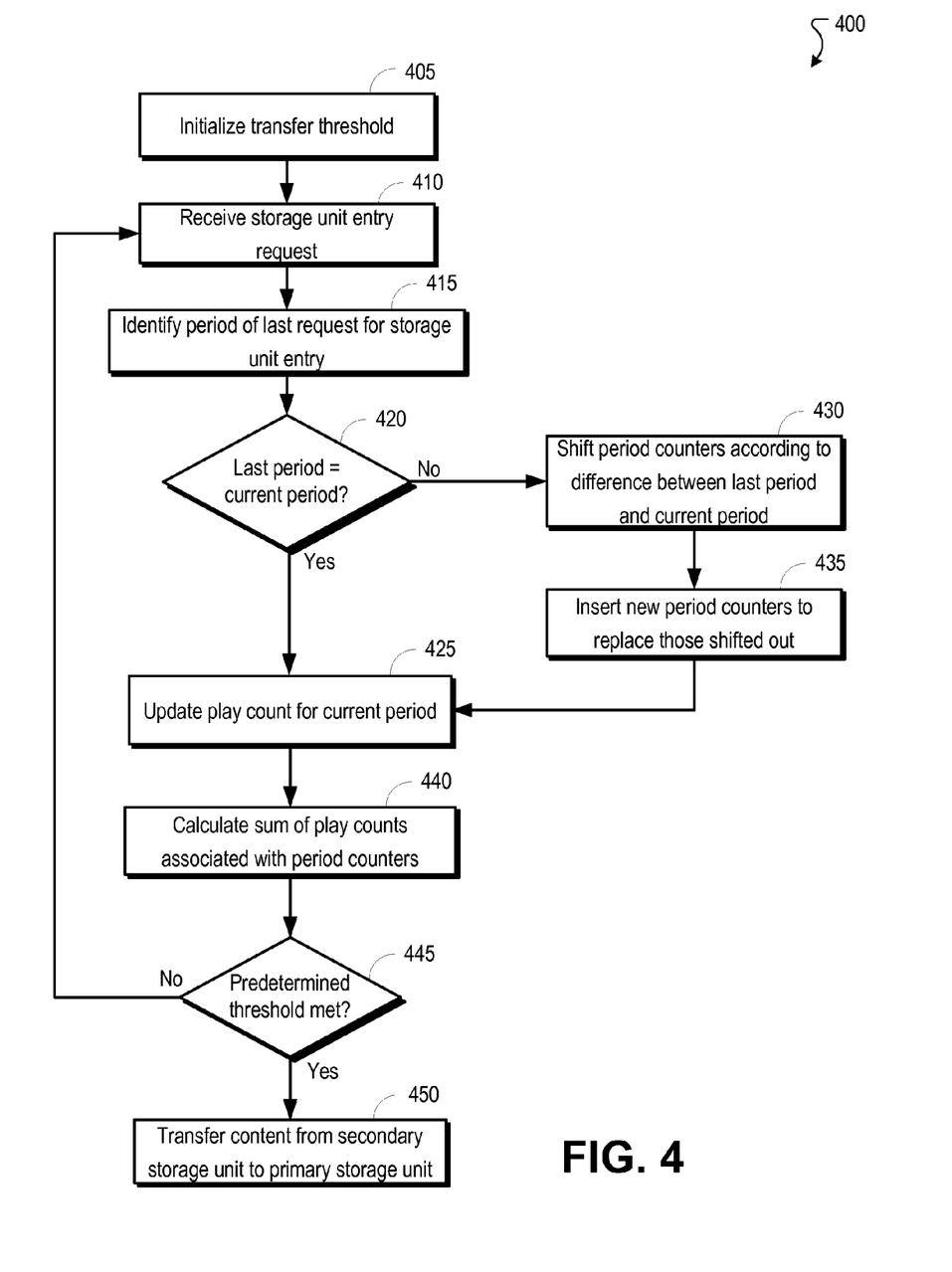
FIG. 4 is a flowchart illustrating an example operational scenario for multi-tier storage for delivery services using a rolling period window.

FIG. 4 is a flowchart illustrating an example process 400 for operating a multi-tier storage using a rolling period window. The process 400 can start at 405 where a transfer threshold is initialized for a secondary storage unit. In embodiments, the transfer threshold can be a fixed number. In embodiments, the transfer threshold can be variable based upon factors such as, for example, a capacity or load associated with a content server 125 of FIG. 1, a capacity or load associated with a content distribution network 115 of FIG. 1, the amount of traffic that is expected for a storage unit, the type of content or data stored within the storage unit, among many other factors. In embodiments, the transfer threshold can be associated with a period of time. For example, the period of time can be a fixed length of time, or the period of time can be dynamic based upon factors such as, for example, total accessed block or CPU load. In embodiments, the period of time can be adjusted by altering the number of period counters maintained within an activity history, or count tag of a storage unit entry (e.g., the activity history can include 3, 4, 5, or any other number of period counters in order to maintain a count of content requests for a desired period of time), and/or by altering the length of time associated with a period (e.g., each period counter can maintain a count of content requests for a number of minutes, a number of hours, a number of days, or any other predetermined period of time).

At 410, a hit to a secondary storage unit entry can be received. In embodiments, a storage unit entry hit can be the reception of a request for content associated with the storage unit entry by a server (e.g., content server 125 of FIG. 1).

At 415, the period of the storage unit entry's last hit can be identified. In embodiments, rolling period counters can be kept for entries in the secondary storage unit (e.g., secondary storage unit 230 of FIG. 2), and can be accessed and/or updated when a corresponding storage unit entry is hit. In embodiments, a storage unit entry can include a count tag, and the count tag can include one or more period counters. In embodiments, the period associated with each period counter can be fixed or can be dynamic based upon factors such as, for example, capacity and/or load of a server or a network. Each period counter can indicate and/or include the number of hits to the storage unit entry during a specific period of time. In embodiments, each period counter can be associated with a predetermined maximum number of storage unit requests (e.g., each period counter can be maintained over a predetermined range of requests). For example, each time a storage unit entry is hit, the current period counter can be incremented, and when the number of storage unit requests reaches the predetermined maximum number for the current period, the oldest period counter can be discarded, each of the remaining period counters can be shifted, and a new period counter can be inserted into the corresponding count tag. In embodiments, the number of period counters included in a count tag can be varied and can be based upon many different factors. In embodiments, the first period counter of the plurality of period counters in the count tag can indicate the period of the storage unit entry's last hit. In embodiments, the period counter can also indicate the number of times the storage unit entry was hit during said period of time.

At 420, a determination can be made whether the current period is the same as the period of the storage unit entry's last hit. For example, the period of the storage unit entry's last hit can be identified from the newest period counter of a count tag associated with the storage unit entry or from another data store or server, and the identified period of the storage unit entry's last hit can be compared to a current period. In embodiments, a current period can be maintained within a content server 125 (e.g., at transfer module 240 of FIG. 2).

If, at 420, the determination is made that the current period is the same as the period of the storage unit entry's last hit, the process 400 can proceed to 425. At 425, a play count associated with the current period can be updated for the storage unit entry. In embodiments, a count tag associated with the storage unit entry can be updated to reflect the hit to the storage unit entry. For example, the period counter corresponding with the current period (e.g., the newest period counter of the storage unit entry's count tag) can be incremented to account for the hit to the storage unit entry. In embodiments, an activity history associated with a storage unit entry can be maintained, for example, within a server or data store. When the secondary storage unit entry is hit, the activity history associated with the storage unit entry can be updated to account for the hit. For example, the activity history associated with the storage unit entry can be updated to reflect that an additional hit has been made to the storage unit entry during the current period.

Returning to 420, if the determination is made that the current period is not the same as the period of the storage unit entry's last hit, the process 400 can proceed to 430. At 430, the period counters of the storage unit entry can be shifted according to the difference between the period of the storage unit entry's last hit and the current period. In embodiments, counts for a predetermined number of periods can be maintained within a count tag for each storage unit entry, and the periods can include the last period in which the storage unit entry was hit as well as a number of periods that chronologically precede the last period in which the storage unit entry was hit. It should be understood, that one or more of the period counters for a storage unit entry can be empty (e.g., where the storage unit entry was not hit during the corresponding period). In embodiments, the difference between the current period and the last period in which the storage unit entry was hit can indicate how many of the storage unit entry's period counters are to be discarded and replaced with empty period counters. For example, the number of period counters that are to be discarded and replaced with empty counters can be equivalent to the difference between the current period and the last period in which the storage unit entry was hit, and one of the new, empty counter can correspond with the current period. In embodiments, empty period counters can replace discarded period counters, period counters that are not discarded can be shifted to the end of the count tag, and the period counter that is now at the beginning of the count tag can correspond with the current period. The following is an example shift that can take place where the period length is five (5) minutes, the number of period counters retained in a count tag is five (5), and the difference in start times between the current period and the last period in which the storage unit entry was hit is fifteen (15) minutes: the number of period counters to be discarded would be equal to the start-time difference between periods, fifteen (15), divided by the period length, five (5), and, therefore, the three (3) oldest period counters of the count tag would be discarded, the newest period counter would be shifted to the next-to-last spot in the count tag, and three (3) empty period counters corresponding with the three (3) periods between the last period of a hit and the current period (current period inclusive) would be added to the count tag, with the first counter (now empty counter) now corresponding to the current period.

At 435, one or more new period counters can be inserted at the beginning of the storage unit entry's count tag to replace the discarded counters or the counters that were shifted out. In embodiments, the newest period counter (e.g., the first counter in the count tag) can correspond with the current period. After the one or more new period counters are inserted, the process 400 can proceed to 425.

At 440, a sum of the play counts associated with each period counter of the storage unit entry can be calculated. In embodiments, each period counter within a count tag can indicate the number of times the storage unit entry was hit during a corresponding period. The play counts of each of the period counters can be added together to calculate a total number of times the storage unit entry was hit over the period of time covered by the period counters in combination. For example, where each period counter accounts for a five (5) minute period, and a count tag maintains a maximum of five (5) period counters, the number of times the storage unit entry was hit over the last twenty to twenty-five (25) minutes (as low as twenty depending on the current position within the current period) can be calculated by summing the play counts of each of the period counters. In embodiments, the number of period counters maintained within a count tag can be varied to account for larger or smaller periods of time. In embodiments, the time associated with each period counter can be varied to account for larger or smaller periods of time.

At 445, a determination can be made whether the predetermined threshold has been met at the hit storage unit entry. In embodiments, the sum of the play counts of each of the period counters associated with the storage unit entry can be compared to the predetermined threshold. If the sum of the play counts is less than, or in some cases equal to, the predetermined threshold, the determination can be made that the predetermined threshold has not been met and the process 400 can return to 410. In embodiments, the updated activity information (e.g., the updated period counters) for the secondary storage unit entry can be stored until the secondary storage unit entry is hit again at 410.

If, at 445, the determination is made that the sum of the play counts of each of the period counters associated with the storage unit entry is greater than, or in some cases equal to, the predetermined threshold, the determination can be made that the predetermined threshold has been met and the process 400 can proceed to 450. At 450, the content associated with the storage unit entry for which the predetermined threshold has been met can be transferred from the secondary storage unit (e.g., secondary storage unit 230 of FIG. 2) to a primary storage unit (e.g., primary storage unit 220 of FIG. 2). In embodiments, after the content is written to the primary storage unit 220, the content can be removed from the secondary storage unit entry. For example, the content can become the MRU entry of a primary storage unit 220. In embodiments, when content is transferred to the primary storage unit 220, a LRU entry within the primary storage unit can be transferred from the primary storage unit to the secondary storage unit 230. For example, the LRU entry of the primary storage unit can become the MRU entry of the secondary storage unit 230, and the activity history associated with the storage unit entry can be reset.

Figure 5:
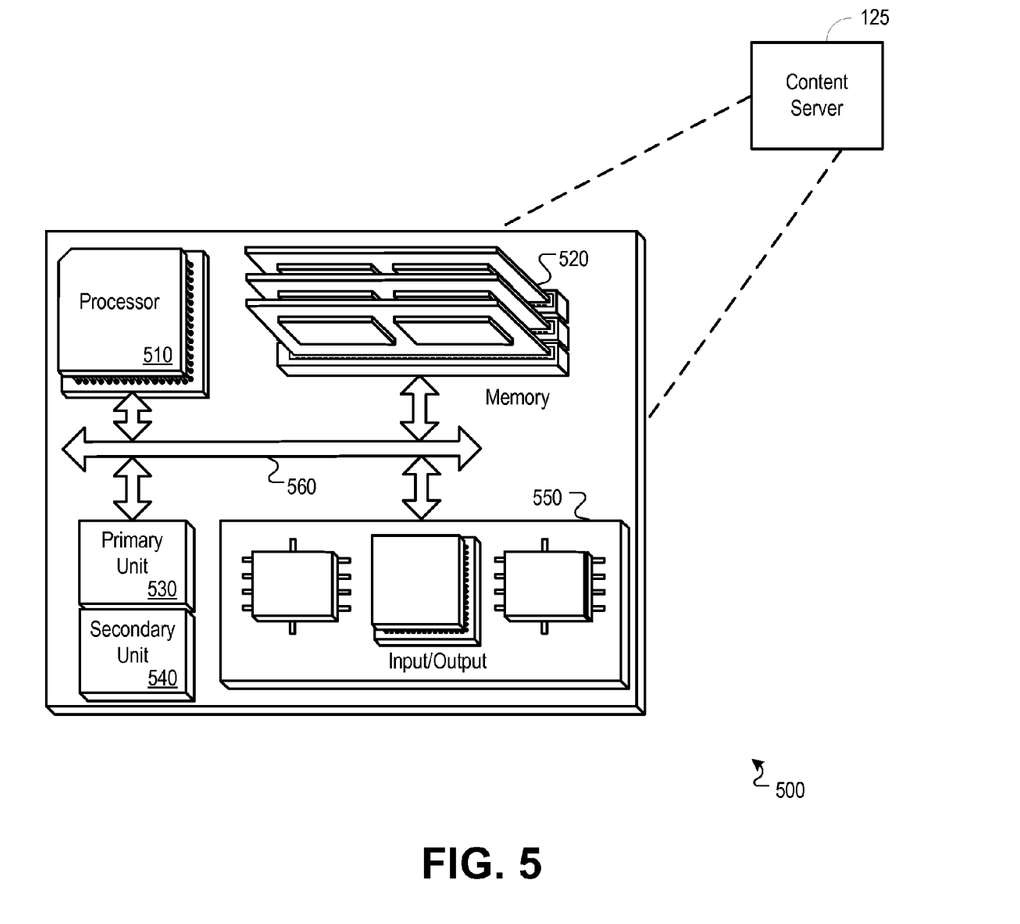
FIG. 5 is a block diagram illustrating an example hardware configuration operable to provide multi-tier storage for delivery services.

FIG. 5 is a block diagram illustrating an example hardware configuration 500 operable to provide multi-tier storage for delivery services. While a content server 125 is shown, it should be understood that many different kinds of network devices can implement a multi-tier storage for delivery services. The configuration 500 can include a processor 510, a memory 520, a primary storage unit 530, a secondary storage unit 540, and an input/output device 550. Each of the components 510, 520, 530, 540 and 550 can, for example, be interconnected using a system bus 560. The processor 510 is capable of processing instructions for execution within the configuration 500. In one implementation, the processor 510 is a single-threaded processor. In another implementation, the processor 510 is a multi-threaded processor. The processor 510 is capable of processing instructions stored in the memory 520 or on the storage device storage units 530 or 540.

The memory 520 stores information within the configuration 500. In one implementation, the memory 520 is a computer-readable medium. In one implementation, the memory 520 is a volatile memory unit. In another implementation, the memory 520 is a non-volatile memory unit.

In some implementations, the storage device storage units 530 and 540 are capable of providing mass storage within the configuration 500. In one implementation, the storage device storage units 530 and 540 are a computer-readable medium. In various different implementations, the storage device storage units 530 and 540 can, for example, include a hard disk device, an optical disk device, flash memory, random-access memory, or some other large capacity storage device. It should be understood that more storage units can be available in addition to the primary storage unit 530 and secondary storage unit 540.

The input/output device 550 provides input/output operations for the configuration 500. In some implementations, the input/output device 550 can include one or more of a plain old telephone interface (e.g., an RJ11 connector), a network interface device (e.g., an Ethernet card), a serial communication device (e.g., RS-232 port), and/or a wireless interface device (e.g., 802.11 card). In additional and/or other implementations, the input/output device can include driver devices configured to receive input data and send output data to other input/output devices, such as one or more client devices 105a-c of FIG. 1, as well as sending communications to, and receiving communications from one or more networks (e.g., content delivery network(s) 120 of FIG. 1, content distribution network(s) 115 of FIG. 1, etc.). Other implementations, however, can also be used, such as mobile computing devices, mobile communication devices, set-top box television client devices, etc.

Those skilled in the art will appreciate that the invention improves upon methods and apparatuses for implementing a multi-tiered storage unit within a server. Methods, systems, and computer readable media can be operable to facilitate the transfer of content associated with storage unit entries between two or more storage units. The transfer of content between two or more storage units can be based upon a count of the number of hits to the storage unit entry. In embodiments, the transfer of content between two or more storage units can be further based upon a predetermined threshold associated with a period.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method of providing content from a first device to a second device upon a request for the content by the second device, the method comprising:
   receiving a request associated with content in a secondary storage unit;
   incrementing a count of the number of received requests associated with the content, wherein the count of the number of received requests associated with the content is identified from a field associated with the content, wherein the field associated with the content comprises one or more counters, each of the one or more counters being associated with a period of time, wherein each of the one or more counters maintains a sub-count of the number of received requests associated with the content, the sub-count being the number of received requests associated with the content over the period of time associated with the counter, and wherein the count of the number of received requests associated with the content is determined by summing the sub-counts of all of the counters;
   identifying a period of time associated with the newest counter of the field associated with the content;
   when the identified period of time is not the same as a current period of time:
      removing a number of the one or more counters from the field, the number of counters being based upon the difference between the identified period of time and the current period of time;
      if any of the one or more counters remain after removing the number of the one or more counters, shifting the remaining counters to the end of the field;
      replacing the removed counters with empty counters, the empty counters being inserted from the beginning of the field; and
      incrementing a counter corresponding with the current period;
   when the count of the number of received requests associated with the content exceeds a predetermined threshold, transferring the content from the secondary storage unit to a primary storage unit, wherein the primary storage unit has a higher throughput rate than the secondary storage unit.

2. The method of claim 1, wherein:
   the field associated with the content comprises one or more counters, each of the one or more counters being associated with a range of a number of requests and each of the one or more counters maintains a sub-count of the number of received requests associated with the content over the corresponding range of requests associated with the counter; and the count of the number of received requests associated with the content is determined by summing the sub-counts of all of the counters.

3. The method of claim 1, further comprising:

transferring content associated with a storage unit entry from the primary storage unit to the secondary storage unit.

4. The method of claim 1, wherein the primary storage unit is a solid-state drive.

5. The method of claim 1, wherein the secondary storage unit is a hard disk drive.

6. An apparatus comprising:

an interface configured to receive a hit associated with content, the content being within a secondary storage unit;

a transfer module configured to:

increment a count of the number of received requests associated with the content, wherein the count of the number of received requests associated with the content is identified from a field associated with the content, wherein the field associated with the content comprises one or more counters, each of the one or more counters being associated with a period of time, and wherein each of the one or more counters maintains a sub-count of the number of received requests associated with the content, the sub-count being the number of received requests associated with the content over the period of time associated with the counter;

determine the count of the number of received requests associated with the content by summing the sub-counts of all of the counters;

identify a period of time associated with the newest counter of the field associated with the content;

when the identified period of time is not the same as a current period of time:

remove a number of the one or more counters, the number of counters being based upon the difference between the identified period of time and the current period of time;

if any of the one or more counters remain after removing the number of the one or more counters, shift the remaining counters to the end of the field;

replace the removed counters with empty counters; and increment a counter corresponding with the current period;

when the count of the number of received requests associated with the content exceeds a predetermined threshold, transfer the content from the secondary storage unit to a primary storage unit.

7. The apparatus of claim 6, wherein the transfer module is further configured to:

transfer content associated with a storage unit entry from the primary storage unit to the secondary storage unit.

8. One or more non-transitory computer readable media having instructions operable to cause one or more processors to perform the operations comprising:

receiving a request associated with a content within a secondary storage unit;

incrementing a count of the number of received requests associated with the content, wherein the count of the number of received requests associated with the content is identified from a field associated with the content, wherein the field associated with the content comprises one or more counters, each of the one or more counters being associated with a period of time, wherein each of the one or more counters maintains a sub-count of the number of received requests associated with the content, the sub-count being the number of received requests associated with the content over the period of time associated with the counter, and wherein the count of the number of received requests associated with the content is determined by summing the sub-counts of all of the counters;

identifying a period associated with the newest counter of the field associated with the content;

when the identified period is not the same as a current period:

removing a number of the one or more counters, the number of counters being based upon the difference between the identified period and the current period;

if any of the one or more counters remain after removing the number of the one or more counters, shifting the remaining counters to the end of the field;

replacing the removed counters with empty counters; and incrementing a counter corresponding with the current period;

when the count of the number of received requests associated with the content exceeds a predetermined threshold, transferring the content from the secondary storage unit to a primary storage unit.

9. The one or more non-transitory computer-readable media of claim 8, wherein the identified period is a range between a minimum and a maximum number of requests associated with the content and the current period is a range which the current number of requests for the content is within.

10. The one or more non-transitory computer-readable media of claim 8, further comprising:

transferring content associated with a storage unit entry from the primary storage unit to the secondary storage unit.

11. The one or more non-transitory computer-readable media of claim 8, wherein the secondary storage unit is a hard disk drive and the primary storage unit is a solid-state drive.

* * * * *